United States Patent [19]
Delias

[11] Patent Number: 5,301,730
[45] Date of Patent: Apr. 12, 1994

[54] MOTORCYCLE TIRES

[75] Inventor: Alain Delias, Perignat-les-Sarlieves, France

[73] Assignee: Compagnie Generale de Etablissements Michelin - Michelin & Cie, Clermont-Ferrand, France

[21] Appl. No.: 934,618
[22] PCT Filed: Jan. 7, 1991
[86] PCT No.: PCT/FR91/00006
§ 371 Date: Sep. 3, 1902
§ 102(e) Date: Sep. 3, 1992
[87] PCT Pub. No.: WO92/12019
PCT Pub. Date: Jul. 23, 1992
[51] Int. Cl.⁵ .................. B60C 9/18; B60C 9/20; B60C 9/22
[52] U.S. Cl. .................. 152/531; 152/526; 152/533
[58] Field of Search .............. 152/531, 533, 526

[56] References Cited

U.S. PATENT DOCUMENTS
4,402,356  9/1983  Musy .
4,880,043  11/1989  Decima et al. .

FOREIGN PATENT DOCUMENTS
0219311  4/1987  European Pat. Off. .
3231003  10/1991  Japan .................. 152/531
944876  12/1959  United Kingdom .
2157239  10/1985  United Kingdom .

Primary Examiner—Michael W. Ball
Assistant Examiner—Adrienne C. Johnstone
Attorney, Agent, or Firm—Oblon, Spivak, McClelland, Maier & Neustadt

[57] ABSTRACT

A motorcycle tire includes a belt consisting successively, starting from casing ply 22 to tread 11, of a crown ply 12 at 0°, then a crown ply 13 at 45°, and a crown ply 14 at −45°.

3 Claims, 2 Drawing Sheets

MOTORCYCLE TIRES

BACKGROUND OF THE INVENTION

Field of the Invention

This invention relates to tires designed for motorcycles.

Description of the Related Art

The shift to the tire design known under the name of "belted radial" has taken place, for motorcycles, only during the last decade. As explained in an article published in the magazine "Moto Journal," of January 1984, it has been considered that a tire with one or two casing ply(plies) at 90° and a crown ply at 0°, constituting a reinforcement construction that is simple and reduced to the essential, could very well be suitable as a rear tire on street motorcycles, even heavy and powerful street motorcycles.

To assure a good behavior for a street motorcycle, it was proposed by patent application FR 2 611 599 to associate, with such a rear tire, a front tire having a radial casing and two crown plies oriented at ±25° in relation to the median plane perpendicular to the axis of rotation of the tire.

In this known way, a completely satisfactory solution is provided for most conditions of use of motorcycles. However, in case of very fast driving, especially when the driver undertakes sharp accelerations while turning, when the tires are still in pronounced camber, the rear tire offers an insufficient drive ability, due to a small drift strength.

Numerous constructions have been proposed, without thereby offering appreciable improvement, because if at times one or the other of the properties is improved, it is at the cost of an often considerable degradation of other properties.

SUMMARY OF THE INVENTION

This invention aims at obtaining a considerable improvement in drive ability, without jeopardizing the other performance characteristics of the tire in service, particularly without degrading the behavior on the road of the equipped motorcycles.

According to the invention, the motorcycle tire comprising a central part including the tread, and two sidewalls each extending between one end of the central part and a bead intended to assure hooking on the rim, said central part, seen in radial section, forming approximately an arc, said tire being reinforced by a casing extending from one bead to the other, and by a belt placed in the central part, between the casing and the tread, said belt comprising one or more layers of cards oriented approximately parallel to a plane perpendicular to the axis of rotation and placed on the casing along the entire width of the tread, is characterized in that the belt comprises of, in addition to said layer or layers of cards, and placed radially thereover, a reinforcement containing cords forming an angle $\alpha$ in relation to a plane perpendicular to the axis of rotation of the tire, and an angle $-\beta$ in relation to said plane, said angles $\alpha$ and $\beta$ being between the values 35° and 55°.

Of course, by cord both a single filament and cords or equivalent assemblies of a plurality of filaments must be understood, and this regardless of the material used. An important specific characteristic of this invention is the sequence of the angles made by the various crown reinforcement frameworks in the ordinary sense that is attributed to these angles: 0° for the first crown ply covering the casing ply approximately over a width corresponding to the width of the tread, and finally a reinforcement with crossed angles that are equal to 45°±10°. This reinforcement can consist of two plies, the cords of one being oriented along angle $\alpha$, and the cords of the next being oriented along angle $-\beta$. Or further, the reinforcement consists of a twilled fabric ply in which the cords are intertwined, like the warp threads and weft threads of a fabric.

When it is said that the cords are oriented approximately parallel to a plane perpendicular to the axis of rotation, this means that they form an angle of 0° in relation to this plane, or a very slight angle, such as for example the one which results from the winding of a cord or a strip of several cords from one side to the other of the central part to constitute the first crown ply. These cords at 0° are placed over the casing at 90°, i.e., under the crown plies at angle $+\alpha$, $-\beta$, and not over the plies at angle $+\alpha$, $-\beta$, as is ordinarily the case for these reinforcement cords whose role is to assure a binding of the tire, to prevent the centrifuging at high speed from deforming it in too great a manner.

As for the crown plies at angle $+\alpha$, $-\beta$, it is essential that these angles be of a value much higher than the ordinary values which are within the 10°-30° range.

BRIEF DESCRIPTION OF THE DRAWINGS

The invention will be perfectly understood by consulting the following description and the accompanying drawing where.

DETAILED DESCRIPTION OF THE PREFERRED EMBODIMENTS

Figure 1:
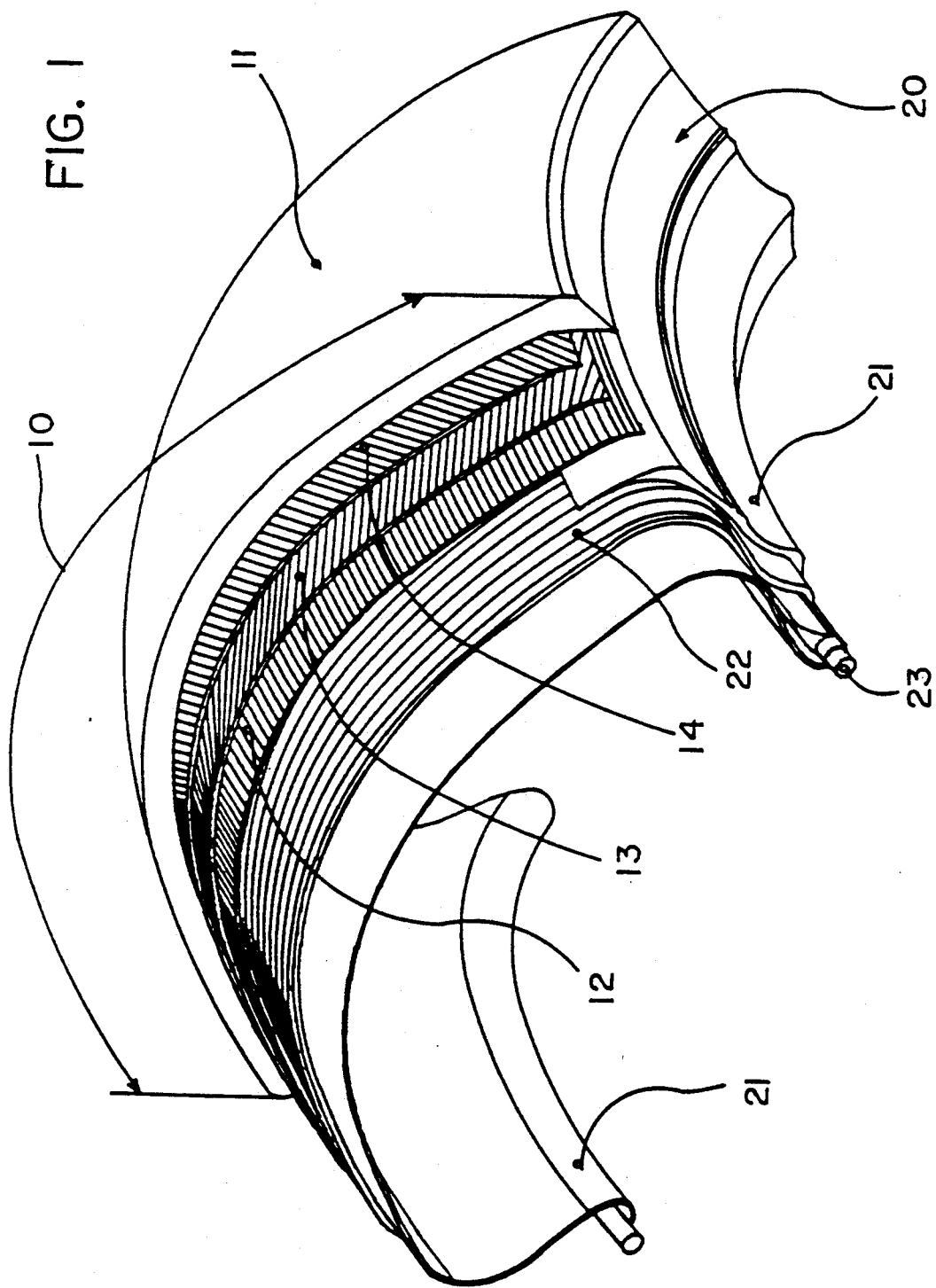
FIG. 1 is a cutaway of a tire according to an embodiment of the invention.

The typical profile of a motorcycle tire is seen in FIG. 1, in which central part 10 including tread 11 is rounded. The tire comprises two sidewalls 20 each terminated by a bead 21 intended to be mounted on a rim. The tire is reinforced by a casing: in this example, a radial casing ply 22 going from one bead 21 to the other, turned over in each bead around a bead wire 23. But it could also be two cross plies, whose angle drops for example to a value on the order of 65°.

The three crown plies 12, 13, and 14 constituting the belt are also seen. Each of the crown plies axially occupies a width corresponding approximately to the width of tread 11, with a slight reduction in width from one ply to the next starting with the casing ply and going from there to the tread. Thus all the crown plies contribute to the functional characteristics of the tire, regardless of the camber angle under which it is used.

Figure 2:
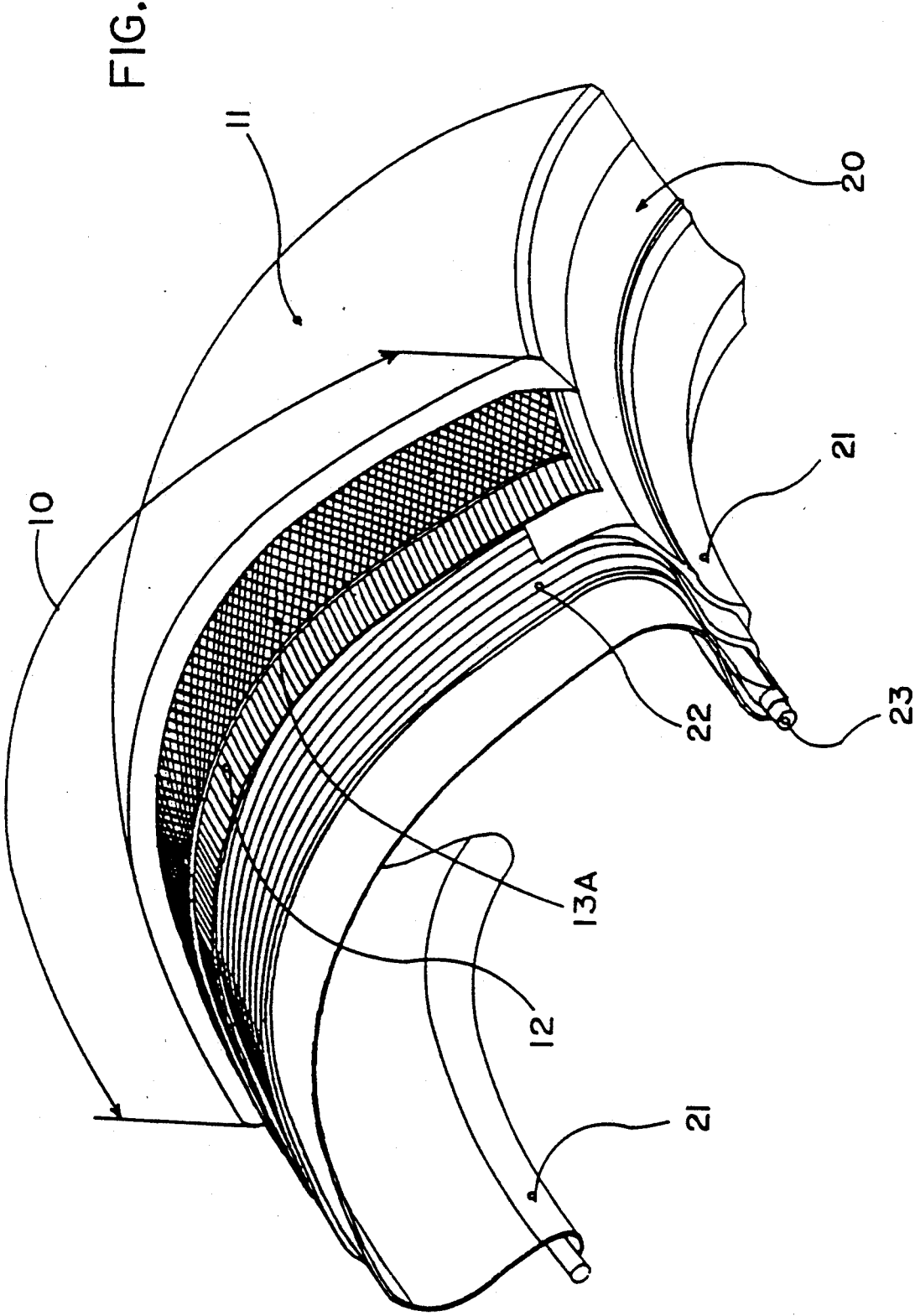
FIG. 2 is a cutaway of a tire according to another embodiment of the invention.

In FIG. 2, plies 13 and 14 are replaced by a twilled fabric ply 13A.

A tire according to this invention has been subjected to various tests and compared with several other reference tires, selected by virtue of their excellent performance in at least one of the criteria observed by the various tests. In all cases, the casing ply (NC) at 90° is of nylon. The crown ply (NS) at 0° is, when it is present, made of aramid, and the crown plies at angle $+\alpha$, $-\beta$ are, when they are present, of aramid or of nylon. The sequence of crown plies is designated $NS_1$, $NS_2$, $NS_3$.

The various criteria observed result either in a measurement, or in an estimation resulting in a mark which is lower as the performance declines. The tests were always conducted with the same front tire when it involved an assessment on a motorcycle, whereas the various tires compared were mounted on the back. However, it must be noted that the tire according to the invention can be used equally in the front and/or in the back. The considerations making it possible to select a pair of tires for a motorcycle are furthermore known and are not part of this invention.

|   | Tire | | | | Limit Speed | Motorcycle Stability | | | Wear in Curve | Wear in straight line | Stability of the profile during centrifuging |
|---|---|---|---|---|---|---|---|---|---|---|---|
|   | NC | NS$_1$ | NS$_2$ | NS$_3$ | | Straight Line | Curved Line | Drive Ability | | | |
| 1 | 90° | 0° |  |  | 350 | 9 | 7 | 7 | 7 | 9 | 10 |
| 2 | 90° | 45° | −45° | 0° | 270 | 8.5 | 8 | 8.5 | 7 | 9 | 10 |
| 3 | 90° | 0° | 45° | −45° | 306 | 9 | 8.5 | 9 | 10 | 10 | 10 |
| 4 | 90° | 0° | 30° | −30° | 270 | 9 | 8.5 | 8 | 8 | 9 | 10 |
| 5 | 90° | 25° | −25° |  | 238 | 9 | 7.5 | 9 | 10 | 7 | 7 |

These results show that, relative to the reference tire, with a casing at 90°, and with a single crown ply at 0°, the addition of two plies at ±45°, over the ply at 0° makes it possible to increase appreciably the drive ability, while having only a negligible loss elsewhere. It should be noted in particular that any other positioning of the ply at 0° degrades the result in limit speed, and that it is not possible to deviate too much from the angle of 45° for crown plies 13 and 14, i.e., plies NS$_2$ and NS$_3$.

In a tire, drifting causes a crosswise shear of the overall crown framework (casing and belt) and a lateral bending of said framework (shear and bending in the plane of contact with the road). The applicant attributes the good properties of the construction proposed to the fact that the presence of cords at zero degree guarantees a great bending strength, and the presence of cords at ±45° assures a great shear strength. The presence of cords at zero degree assures a good stability of the profile (radial section) of the tire, regardless of its speed, which is favorable for controlling the camber thrusts of the motorcycle tire.

The combination of cords at 0° and cords at 45° therefore makes it possible to obtain an excellent drift strength by the contribution of some to the lateral bending strength of the crown, and of others to the shear strength. The importance of the order of superposition of the plies is shown by the differences of performance between examples 2 and 3. The layer of cords at 0°, ordinarily used to bind the reinforcement framework as a whole, must here be used between the casing and the crown plies at $+\alpha°$, $-\beta°$. This angle $\alpha$ can be used as a parameter for regulating the strength: by deviating from 45°, both upward and downward, it is possible to reduce the drift strength without having to change the type of cord, or the density of cords of the ply.

I claim:

1. Motorcycle tire comprising a central part including the tread, and two sidewalls each extending between one end of the central part and a bead intended to assure the hooking on the rim, said central part, seen in radial section, forming approximately an arc, said tire being reinforced by a casing extending from one bead to the other, and by a belt placed in the central part, between the casing and the tread, said belt comprising one or more layers of cords oriented approximately parallel to a plane perpendicular to the axis of rotation and placed on the casing along the entire width of the tread, wherein the belt comprises, in addition to said layer or layers of cords, and placed radially thereover, a reinforcement whose cords form an angle $\alpha$ in relation to a plane perpendicular to the axis of rotation of the tire, and an angle $-\beta$ in relation to said plane, said angles $\alpha$ and $\beta$ being between the values 35° and 55°.

2. Tire according to claim 1, wherein said reinforcement consists of two piles, the cords of one of which form the angle $\alpha$, and the cords of the other form the angle $-\beta$.

3. Tire according to claim 1, wherein said reinforcement consists of a twilled fabric.

* * * * *